United States Patent [19]
Gundlach

[11] 3,733,118
[45] May 15, 1973

[54] FILM TRAINING PROJECTOR
[75] Inventor: Richard P. Gundlach, Belleville, Ill.
[73] Assignee: Gamco Industries, Inc. Big Spring, Tex.
[22] Filed: June 28, 1971
[21] Appl. No.: 157,198

Related U.S. Application Data

[62] Division of Ser. No. 814,127, April 7, 1969, Pat. No. 3,623,801.

[52] U.S. Cl. ..................352/97, 352/194, 353/35
[51] Int. Cl. ...............................................G03b 21/02
[58] Field of Search........................352/85, 97, 194; 353/35

[56] References Cited

UNITED STATES PATENTS

| | | | |
|---|---|---|---|
| 2,986,968 | 6/1961 | Kropp et al. | 353/35 |
| 2,652,745 | 9/1953 | Quinn | 352/97 |
| 2,887,006 | 5/1959 | Yale | 353/35 |
| 3,623,801 | 11/1971 | Gundlach | 352/173 |

*Primary Examiner*—Samuel S. Matthews
*Assistant Examiner*—Russell E. Adams, Jr.
*Attorney*—Lawrence C. Kingsland, et al

[57] ABSTRACT

A visual training projector for projecting intelligible matter from one or two films. The projector may be used to project stationary pictures or motion pictures, as desired, by control from a remote control unit such as a remote operator's handle. Provision is made through a specially designed blower to provide for cooling the projector lamp bulb to accommodate projection from either a horizontal or vertical plane. Special loading means are provided for the film in pressure plates at the projector through solenoid operated gates to provide ready accessibility for loading and unloading. Advancement of the film, past the film aperture, is effected through solenoid and cam operated vibrated shuttles, which are mounted on a ball pivot for two directions of freedom to hold and actuate the film. In order to reduce wear on the film, the film is taken from a supply reel and fed to a take-up reel by sensing arms which sense the tension in guided film loops and control supply and take-up motors to control the play out and take up of the film reels. Where, in addition to the front film, a rear film is used for fixation upon the front film, provision is made for feeding the films in the same direction to facilitate timing. The construction of the film reels and spindles is so designed that the film reels may be wound in either clockwise or counterclockwise direction.

4 Claims, 44 Drawing Figures

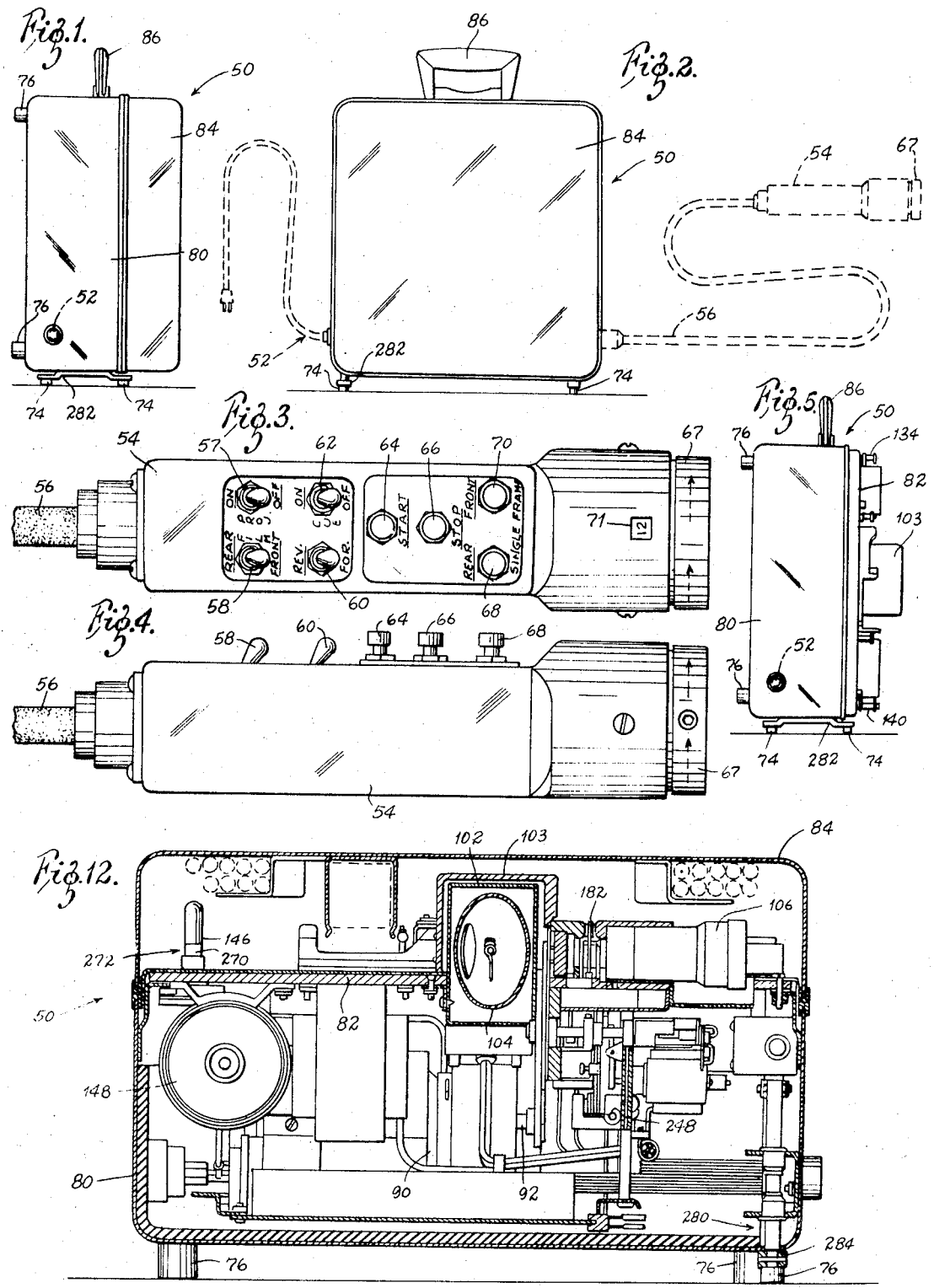

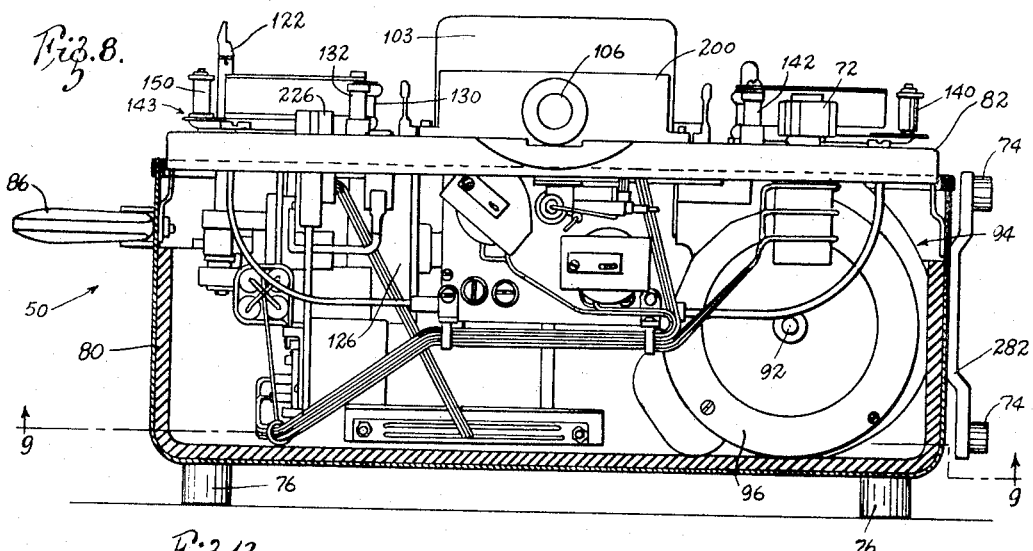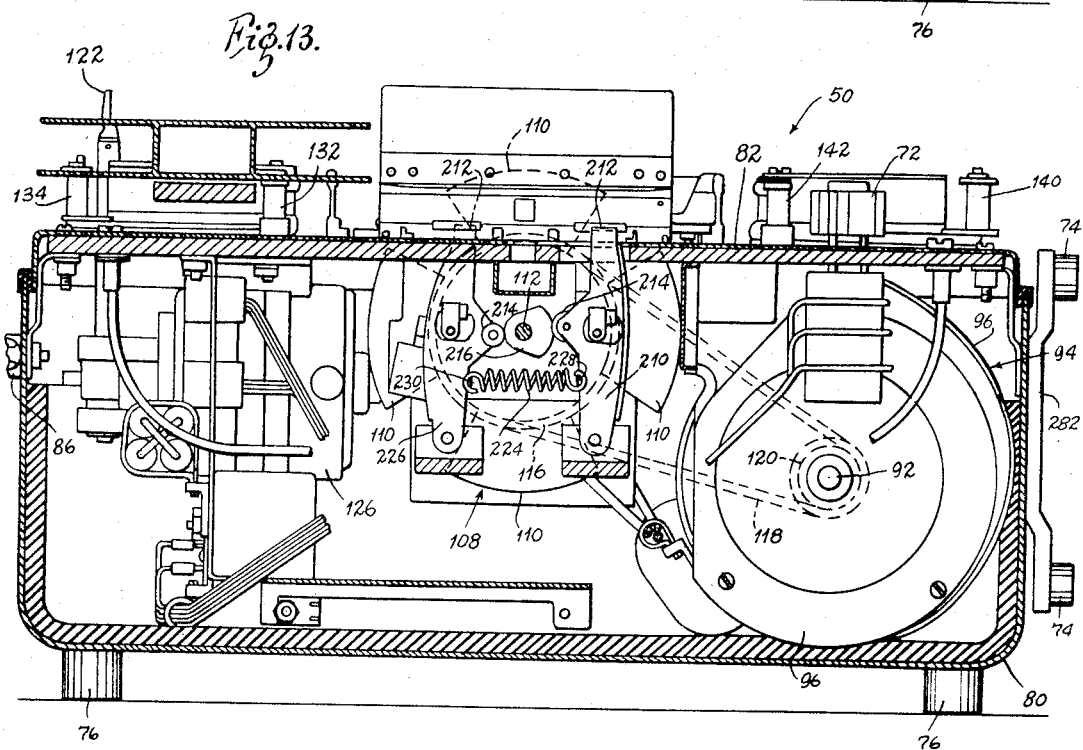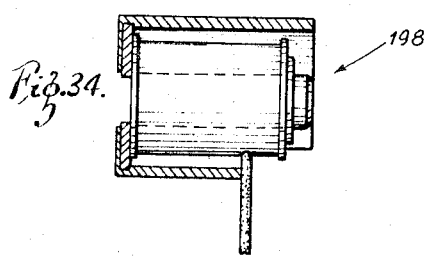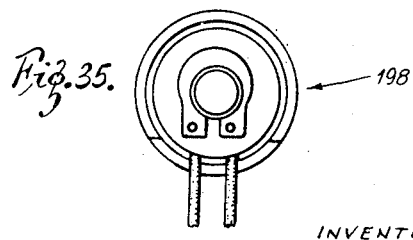

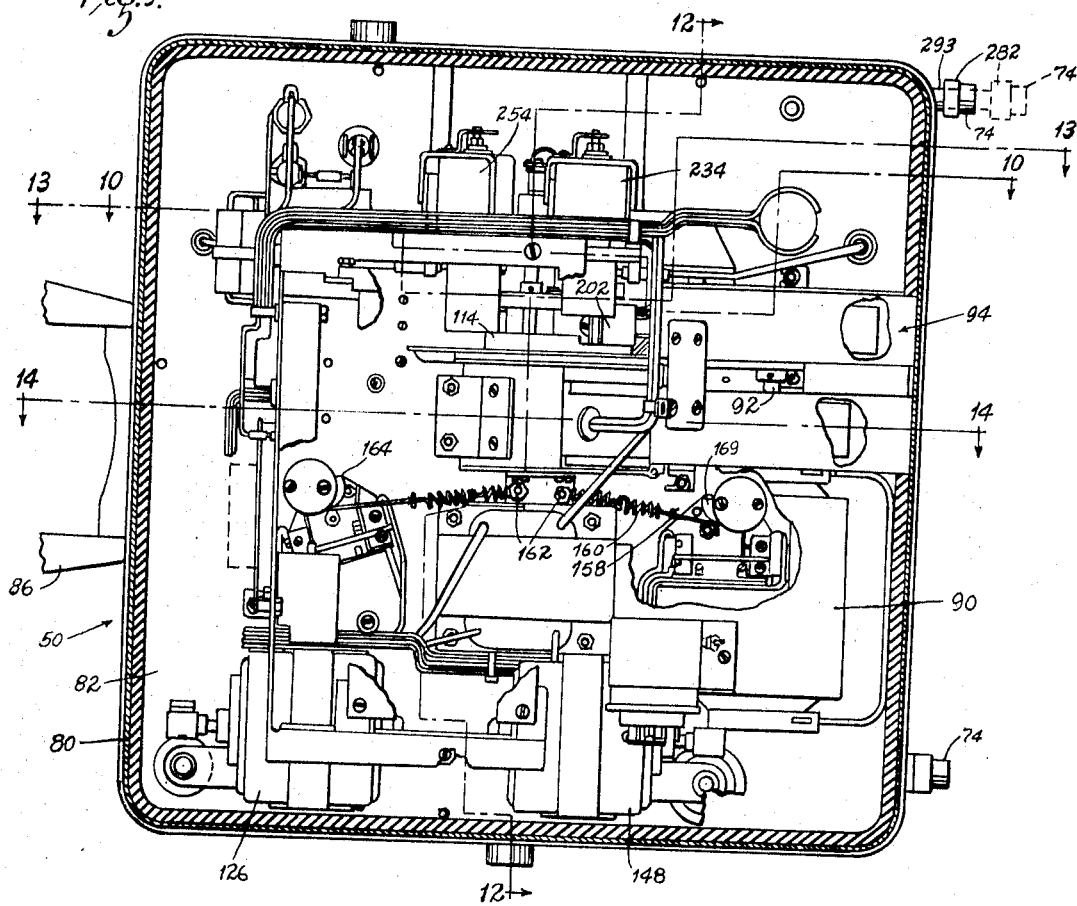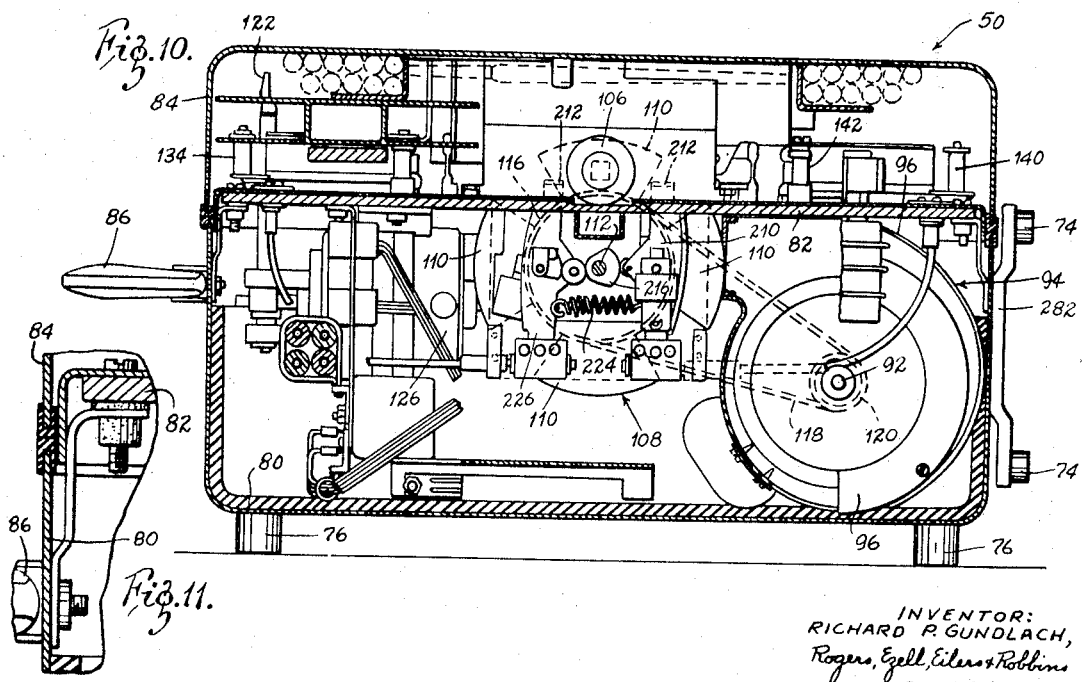

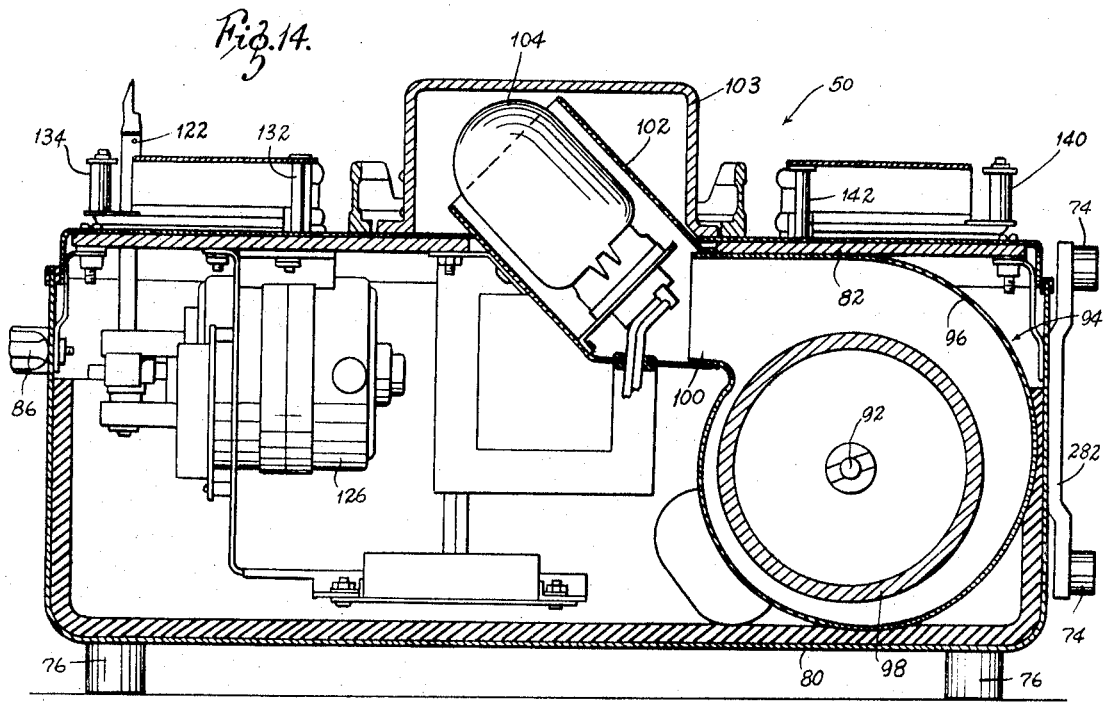
Fig. 14.
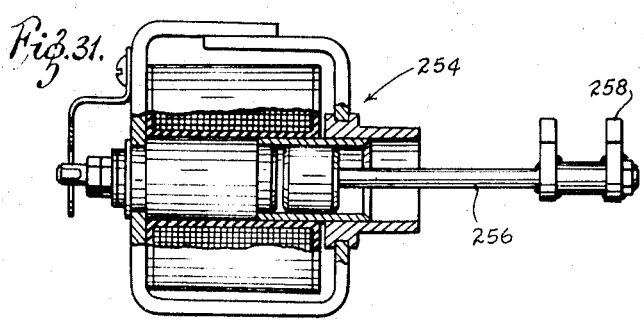
Fig. 31.
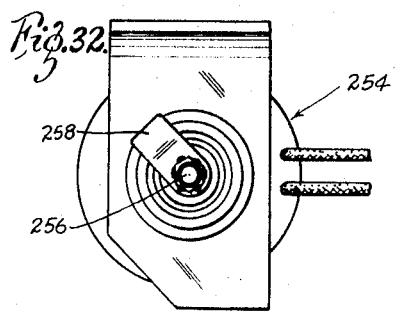
Fig. 32.
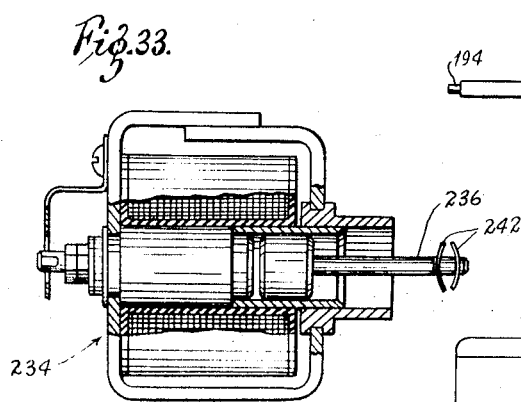
Fig. 33.
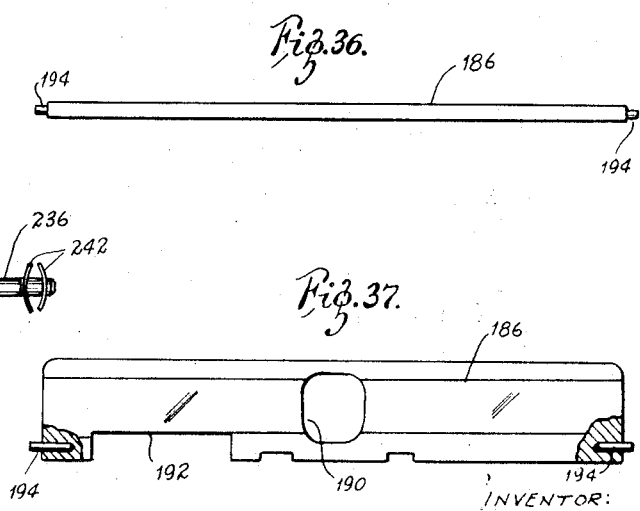
Fig. 36.
Fig. 37.
INVENTOR:
RICHARD P. GUNDLACH
Rogers, Ezell, Eilers & Robbins
ATTORNEYS

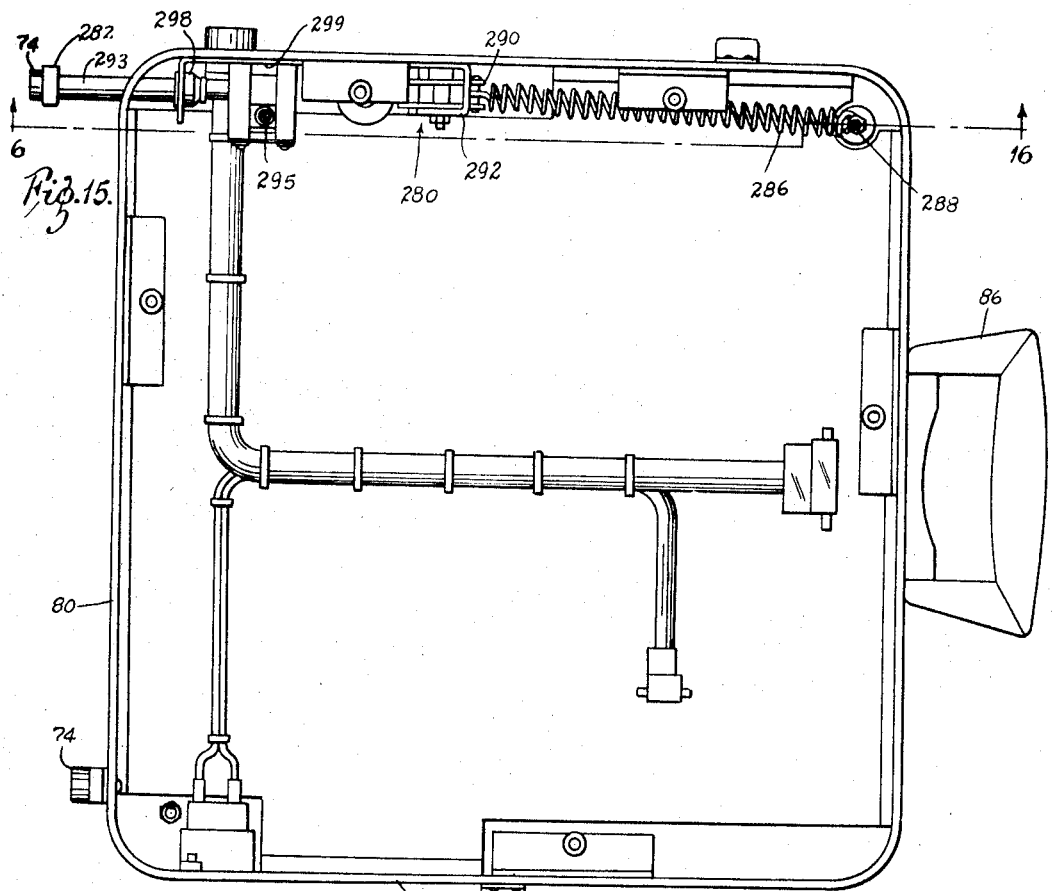
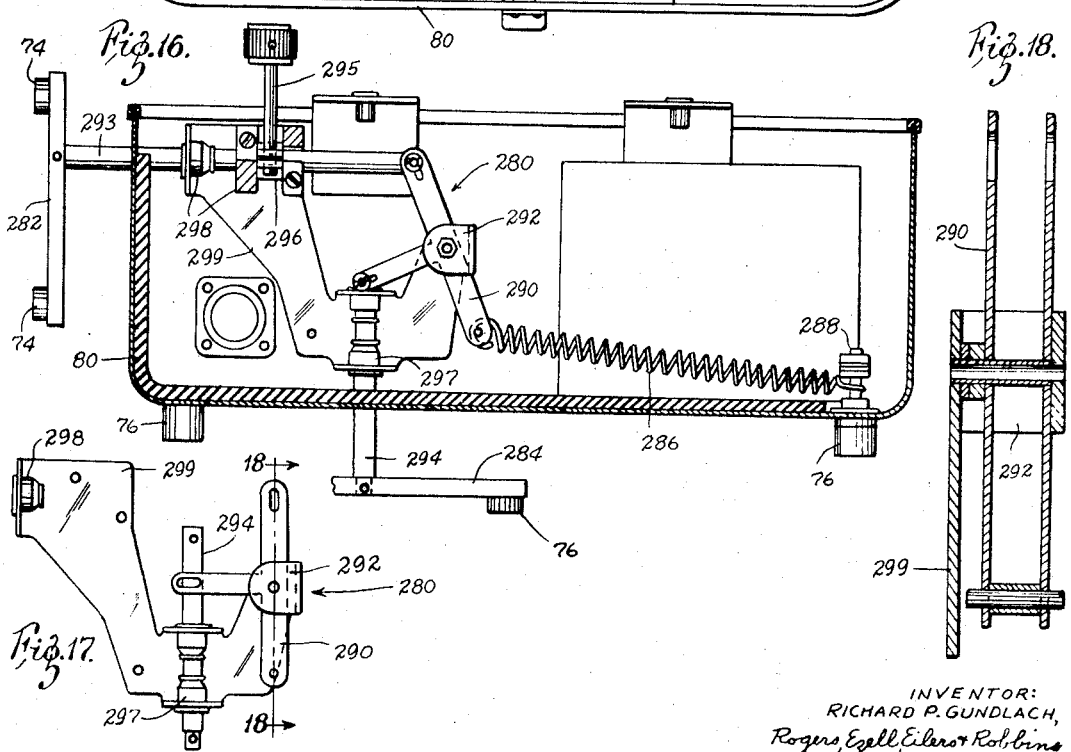

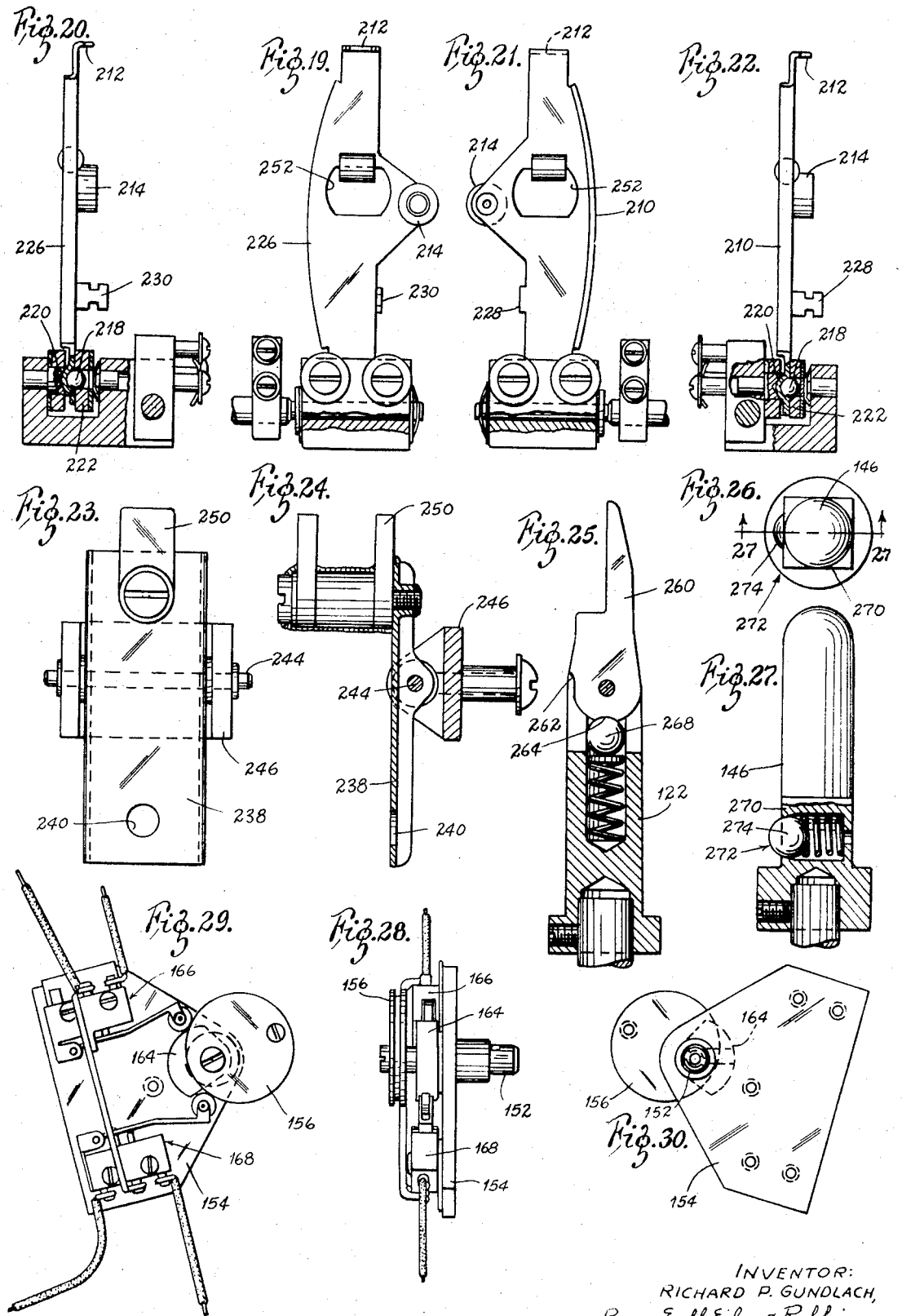

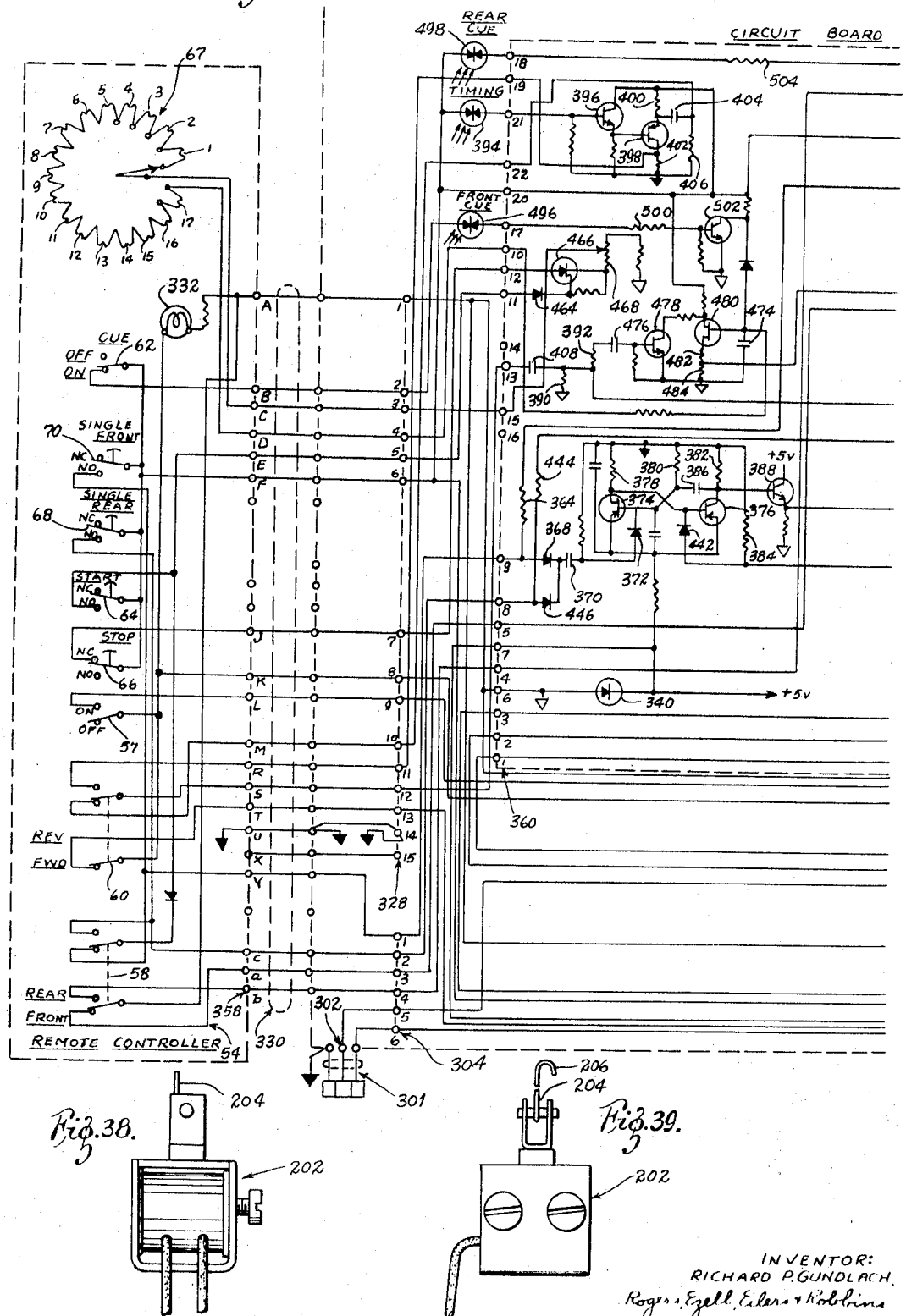

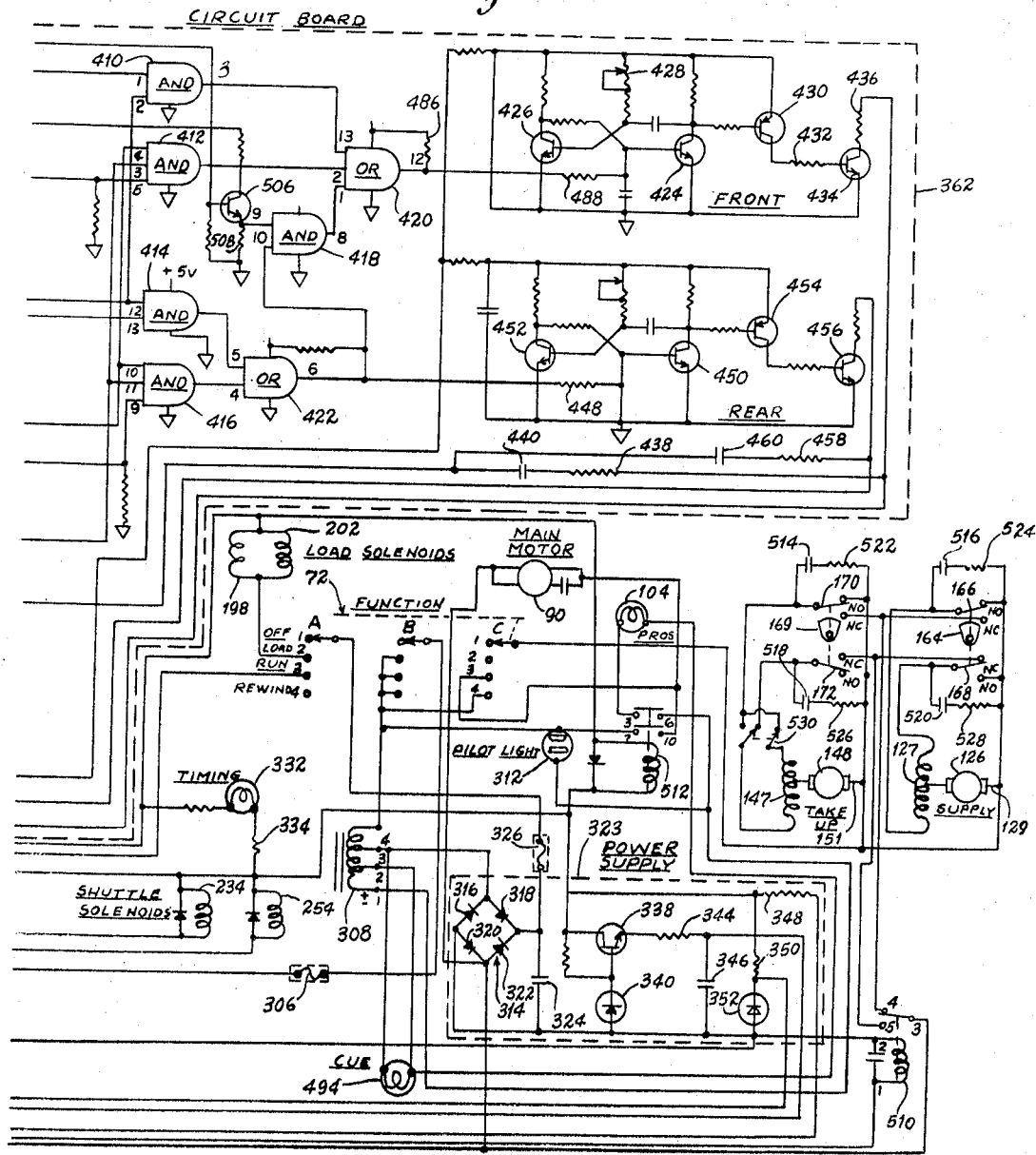
Fig. 43.
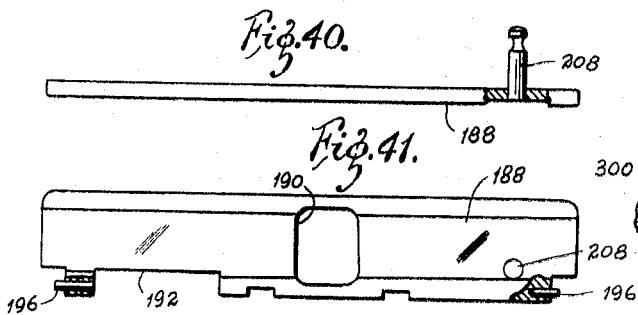
Fig. 40.
Fig. 41.
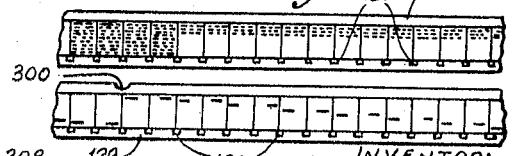
Fig. 44.
INVENTOR:
RICHARD P. GUNDLACH,
Rogers, Ezell, Eilers & Robbins
ATTORNEYS

FILM TRAINING PROJECTOR

RELATED APPLICATIONS

This application is a division of my co-pending application, Ser. No. 814,127, filed Apr. 7, 1969. This application is now U.S. Pat. No. 3,623,801.

BACKGROUND OF THE INVENTION

In the past, visual training projectors have been devised such as those shown in Stoyanoff U.S. Pat. No. 2,775,827 and Kropp U.S. Pat. No. 2,986,968. Such projectors are devised to present a pair of film strips in overlapping relationship before a projector lamp for simultaneous projection upon a viewing screen. One of the film strips, known as a text film, consists of successive frames upon which reading matter is photographed, and the other film strip, referred to as the fixation film, consists of successive frames, which may be alternately fully opaque and wholly transparent, whereby timed, momentary projection of a frame of text in the projection aperture is achieved by feeding the overlapping fixation film strip through a transparent frame at a predetermined rate. The fixation film strip may also consist of successive frames, which are partially opaque and partially transparent, with the ratio of the areas of the transparent and opaque portions being incrementally varied in successive frames, so as to provide a stepped formation along the film strip, whereby successive portions of the matter on the text film are sequentially exhibited or masked to provide successive fixations for reading training as the fixation film is fed step-by-step through the projection aperture with relation to the text film. In this way the reader's eye is trained and guided at desired rates of speed on the projected film.

The film feeding means for the projector include a pair of solenoids, one solenoid for each of the front and rear film strips. The solenoids are energized intermittently to operate through a forward and return stroke, and each is arranged to drive by engagement through sprocket openings one of the films one frame during a forward stroke. The frequency of the intermittent feeding motion is controlled by the control system, which varies the frequency of the operation of the solenoid to a rate desired by the operator.

Such visual training projectors as described above have been limited with respect to their projection capabilities to restrict in one plane of projection either horizontal or vertical. Further, wear and tear on the film has been provided through the usual sprocket arrangement to supply the film from the supply reel and to feed up on the take-up reel. Further, the shuttle feeding system has been restricted through energization of the solenoid because of the type of movement required of the shuttle in advancing the film. Difficulties have also arisen in loading the front and the rear film in the projector which has entailed a laborious and time consuming operation. Likewise, timing of the front and the rear film has been difficult, because of the exactness required for satisfactory operation. Additionally, the projectors have been limited to uniformly wound film.

SUMMARY OF THE INVENTION

By means of this invention there has been provided a visual training projector which can be used as motion picture projector with a single film, or as a visual training projector with front and rear films provided for fixation. The projector is adapted to project in either a horizontal or a vertical plane providing a greater degree of adaptability for presentation of the projected film for various purposes. This is accomplished by the relationship of a tilted lamp and blower channel, enabling the projector to be rotated 90° clockwise in a vertical and a horizontal position, and the two sets of feet which are adjustable by a common adjustment mechanism to provide support in either the vertical or horizontal position with tilt adjustment in either position. Through the relationship of the blower channel with the projector lamp, air is blown upwardly regardless of the horizontal or vertical position.

To obviate wear on the film in the conventional sprocket operation in the sprocket holes of the film to provide supply and take-up from the film reels, sensing arms are employed. These sensing arms connect with a supply reel of film and a take up reel, and by connection to motor switches, over or under feeding of the film is controlled. Thus, the sensing arms are employed to actuate motors to drive the supply and take up wheel spindles to insure that the proper amount of film is fed to the apparatus at the proper rate and thereby eliminates wear and tear provided in the sprocket and the sprocket holes of the film conventionally used in the past.

In the film feeding means, past the projector lens, a shuttle mechanism is employed utilizing a single ball pivot. The shuttles are actuated by a single and common cam and pivoting back and forth is provided through the ball pivot to insure two directions of freedom in the holding and actuation of the shuttle.

Feeding of the film is facilitated for both the front and the rear films through solenoid operated film gates. The pressure plates which guide the film are controlled by solenoids which, upon operation, disengage the pressure plates and provide a free space for ready insertion or removal of the film.

The projector is additionally provided with both clockwise or counterclockwise film wound capability. Conventional projectors in the past have required the film to be wound in a particular direction so that the projector can be properly operated utilizing so-called A or B winding of film. A particular spindle design provided in this invention makes it possible to operate either clockwise or counterclockwise would film. Motor reversal is provided for the film supply in order to accomplish the capability for clockwise or counterclockwise wound film as well as rewinding.

The circuitry employs photocell timing which insures a high degree of accuracy in the operation of the apparatus. Cuing is effected to a high degree of accuracy through remote control in the operator's handle, which has a complete control switching system to effect operation at a remote point from the apparatus.

The above features are objects of this invention and further objects will appear in the detailed description which follows and will be otherwise apparent to those skilled in the art.

For the purpose of illustration of this invention, there is shown in the accompanying drawings a preferred embodiment thereof. It is to be understood that these drawings are for the purpose of example only, and that the invention is not limited thereto.

In the drawings:

FIG. 1 is an end elevation of the equipment shown in carrying position and resting on a work surface;

FIG. 2 is a view in right end elevation of FIG. 1 showing the control and power cords extended in dotted lines;

FIG. 3 is an enlarged plan view of the hand control assembly;

FIG. 4 is a view in side elevation of the assembly of FIG. 3;

FIG. 5 is a view in end elevation of the apparatus with the cover removed;

FIG. 8 is a view in section taken on the line 8—8 of FIG. 6;

FIG. 9 is a view in section taken on the line 9—9 of FIG. 8 showing the bottom structure of the equipment;

FIG. 10 is a view in section taken on the line 10—10 of FIG. 9 with the top cover in place;

FIG. 11 is an enlarged fragmentary view of a portion of FIG. 10 showing the cover and base hook up;

FIG. 12 is a view in section taken on the line 12—12 of FIG. 9;

FIG. 13 is a view taken in section on the line 13—13 of FIG. 9 showing the shuttle structure and cam power assembly;

FIG. 14 is a view taken in section on the line 14—14 of FIG. 9 showing the lamp and blower structure;

FIG. 15 is a plan view of the inside of the bottom case;

FIG. 16 is a view in section taken on the line 16—16 of FIG. 15 showing the assembly elevating mechanism;

FIG. 17 is a detailed view showing the linkage for the elevating mechanism;

FIG. 18 is an enlarged vertical sectional view taken on the line 18—18 of FIG. 17;

FIG. 19 is a front elevation of the left hand shuttle and cam power structure;

FIG. 20 is an end elevation taken from the left side of FIG. 19 partially in section;

FIG. 21 is a view in elevation of the right hand shuttle and cam power structure;

FIG. 22 is a view in side elevation taken from the right side of FIG. 21 with the supporting structure partially in section;

FIG. 23 is a view in front elevation of the front solenoid pivot structure;

FIG. 24 is a view in side elevation taken from the right side of FIG. 23 partially in section;

FIG. 25 is a view in vertical section showing the supporting structure for the filler reel spindle;

FIG. 26 is a top plan view of the film reel take up spindle;

FIG. 27 is a view in section taken on the line 27—27 of FIG. 26;

FIG. 28 is a view in elevation of the sensing arm and switch structure;

FIG. 29 is a view of the sensing arm and switch structure taken from the left side of FIG. 28;

FIG. 30 is a side view of the sensing arm and switch structure taken from the right side of FIG. 28 with the wiring omitted;

FIG. 31 is a view in side elevation of the rear solenoid assembly for the operation of the rear shuttle, partly broken away and insections in the center portion;

FIG. 32 is a view in front elevation of the rear solenoid assembly;

FIG. 33 is a view in side elevation of the front solenoid assembly, partly broken away and in vertical section of the center portion thereof for the operation of the front shuttle;

FIG. 34 is a view partly in longitudinal section of the front solenoid assembly for the operation of the front pressure plate;

FIG. 35 is a view in front elevation of the front solenoid assembly;

FIG. 36 is a top plan view of the front pressure plate;

FIG. 37 is a view in front elevation of the front pressure plate;

FIG. 38 is a view in front elevation of the rear solenoid assembly for the operation of the rear pressure plate;

FIG. 39 is a view in side elevation of the rear solenoid assembly taken from the right side of FIG. 38;

FIG. 40 is a top plan view of the rear pressure plate;

FIG. 41 is a view in front elevation of the rear pressure plate;

FIG. 42 is the left half of a circuit diagram of the electrical components of the apparatus;

FIG. 43 is the right half of the circuit diagram; and

FIG. 44 is a fragmentary plan view showing a typical front text film at the top and a rear fixation film used in reading training.

DESCRIPTION OF THE INVENTION

Figure 6:
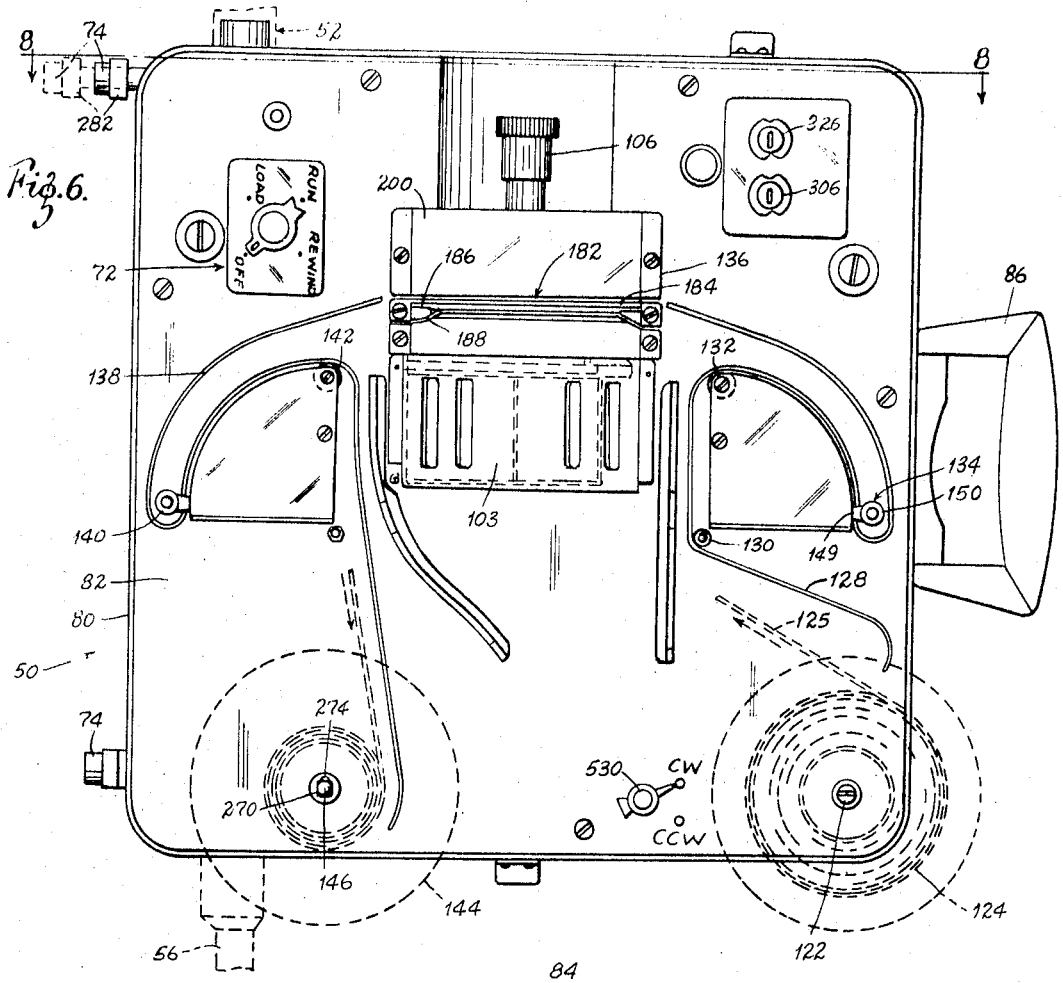
FIG. 6 is an enlarged top plan view of the equipment with the cover removed.
Figure 7:
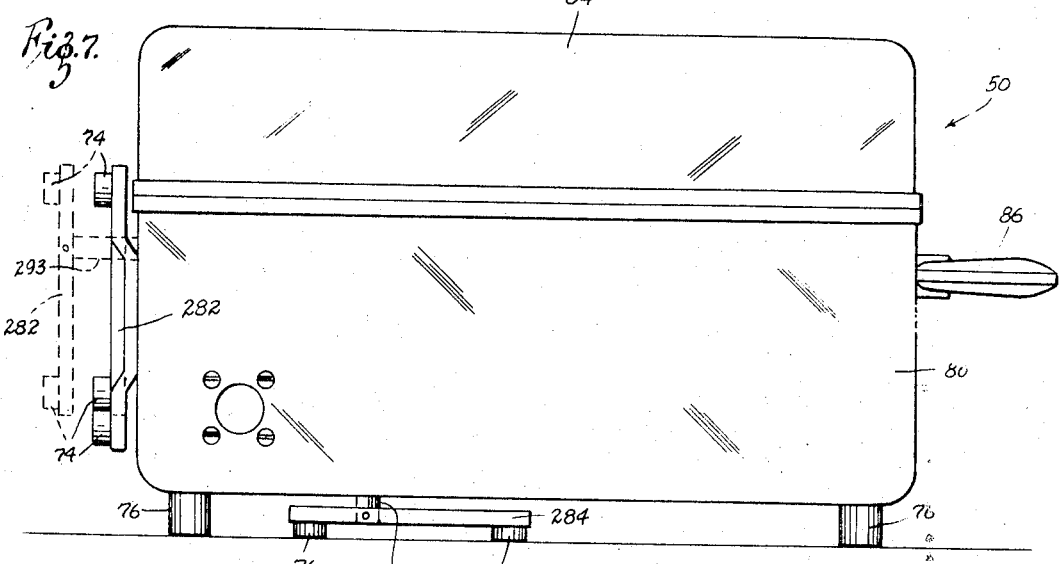
FIG. 7 is a view in end elevation of the assembly of FIG. 6.

Referring now to the drawings, the projector is generally indicated by the reference numeral 50 in FIGS. 1, 2 and 5. It is provided with an electrical cord 52 adapted to be attached to a convenient source of AC current and an operator's handle 54, connected by cord 56 through the projector for remote control operation.

The remote control handle 54 is provided with an on-off projector switch 57, a rear-front film selector switch 58, and a reverse forward switch 60 for the film. An on-off cue-switch for cuing purposes, designated by the numeral 62, likewise is provided. Additional control switches are a start switch 64, a stop switch 66, speed control switch 67, and single frame switches for the rear film 68 and the front film 70. A viewing window 71 is provided to show the speed control setting. A function switch 72 is mounted on the projector operable to Off, Run, Rewind, and Load positions.

The projector 50, as shown in FIGS. 1, 2, 5, 10, 11 and 14 through 18, is provided with feet 74, for a vertical projection, and feet 76 for horizontal projection. Supporting structure for the projector includes a housing 80, which is open topped and closed by a horizontal support base 82. A cover 84 provides for protection of the apparatus and a handle 86 facilitates carrying of the projector as a portable unit.

A main motor 90 is mounted upon a top plate and is provided with a shaft 92, connected to a twin blower unit 94, provided with a stator casing 96 and a bladed rotor 98 eccentrically mounted in the stator. Air is blown through channel 100 through a chimney 102 located at a 45° angle to the lamp housing 103, as best shown in FIG. 14. The chimney 102 houses a projector lamp 104 to provide a source of light to the film aperture to provide for projection through lens 106, as will be further described. The 45° tilted relationship of the chimney 102 insures that air is blown upwardly, past the lamp, at a 45° relationship regardless of whether the projector is in the horizontal position, as shown in FIG. 14, or rotated 90° clockwise to provide for vertical projection as in FIG. 5. A shutter 108 having four vanes 110 is mounted on a shaft 112. The shaft is journaled in a bearing block 114 supported from the top plate. The shaft is powered by a pulley 116, connected by a pulley belt 118 to a pulley 120 mounted on the main motor shaft 92, as best shown in FIG. 13.

FILM ADVANCING MEANS

A supply spindle 122, receiving a supply roll of film shown in dotted lines in FIG. 6 by the reference numeral 124, is connected to a reversible motor 126 having a split field coil 127 through conventional gear reducing mechanisms. The film is fed through path 128, as best shown in FIG. 6, past idlers 130 and 132, and sensing guide 134 to film gate and advancing assembly 136 where film shuttle advancing means is provided, as will be further described hereinbelow. The film is then fed in path 138, past a take up arm sensing guide 140, idler roller 142 and then to a take up reel, indicated in dotted lines by reference numeral 144, which is connected to take up spindle 146. The take up spindle shaft is connected by suitable reducing gear mechanism to take up reversible motor 148 having a split field coil 147, as best shown in FIG. 13.

The supply film sensing guide 134 and the take up film sensing guide 140 are identical in construction and are shown in FIGS. 28, 29 and 30. The supply sensing guide is comprised of a sensing arm 149, provided with a roller 150, around which the film passes as shown in FIG. 6. The sensing arm 149 is pivotally mounted upon a cam shaft 152, journaled in a mounting bracket 154, connected to the underside of the base 82. An eccentric reel 156 is connected at the periphery to a cable 158, which, in turn, is connected to a baising spring 160 anchored by a bolt 162 to the underneath side of the base, as shown in FIG. 9, to bias the sensing arm 149 to the position shown in FIG. 6, while permitting counterclockwise movement as viewed in FIG. 6 when tension upon the film moves the sensing arm. A cam 164 is fixed to the shaft 152 and is adapted to actuate a micro-switch 166, as best shown in FIGS. 28 and 29, The micro-switch arm of switch 166 is adapted to depress a switch element to close a circuit to the split field supply motor to actuate it and feed out additional film in order that the film be supplied to the aperture and advancing means 136 without tension to prevent strain and wear upon the film.

A similar switch 168 is provided on the opposite side of cam 164, as shown in FIG. 28, and operates similarly to switch 166 to reverse the supply motor. The take up sensing guide 140 operates in a like manner to prevent strain or pull upon the film in the path 138. Thus, the guide 140, by means of the sensing arm and cam 169 and switches 170 and 172, operates in a similar fashion through the use of identical parts. The take up motor associated with the take up reel 144 is arranged by appropriate circuitry of the switches 170 and 172, later to be described, to run the split field take up motor forward or reverse, depending on the direction of film motion selected and the size of the film loop, which causes the sensing arm 149 to move in the clockwise or counterclockwise direction, as viewed in FIG. 6.

APERTURE AND FILM ADVANCING MEANS

The reading film 125 and fixation film 129, shown in FIG. 44, are provided with a series of holes 180, which are adapted to be engaged by the shuttle claws used for advancing the film past the aperture and film loading gate, generally identified by reference numeral 182 in FIG. 6. The aperture gate provides a gate for the film and incorporates a film guide plate 184, forming no part of this invention, and for which reference may be had in Kropp et al. U.S. Pat. No. 2,986,968. The guide plate is provided with conventional film guide grooves receiving the front and rear films, and is provided with a front pressure plate 186 and a rear pressure plate 188, as shown in FIGS. 6 and 36, 37, 40 and 41. These pressure plates are similar in construction to the conventional pressure plates shown in the Kropp et al. U.S. Pat. No. 2,986,968, but are provided with hinge pins in order that they may be rapidly operated by solenoids to open the film gate for ready insertion and removal of the film in the feeding operation. Thus, the front pressure plate 186 is provided with a conventional aperture 190 and a slot 192 receiving the shuttle claw for advancing the film through engagement in the notches 180. The rear pressure plate 188 is provided with a similar aperture and slot. The front pressure plate is further provided with hinge pins 194, which are received within a journal in the guide plate. Likewise, the rear pressure plate 188 is provided with hinge pins 196 journaled in a similar fashion. The hinge pins for the front and rear pressure plates provide for a pivotal movement about the pins when the pressure plate solenoids are operated to open the pressure plate in the film gate.

The front pressure plate 186 is operated by a front solenoid 198, best shown in FIGS. 34 and 35. The front solenoid for operating the front pressure plate in the film gate is housed within housing 200. The solenoid for the rear pressure plate is identified by the reference numeral 202 in FIGS. 38 and 39, and is supported upon support plates 114 depending vertically from the base as shown in FIG. 9. The solenoid armature is connected to an elongated hooked member 204 with the hooked end 206 fitting around the pin 208 provided on the pressure plate 188. Upon operation of the solenoid, the vertically and upstanding hooked member 204 causes a rocking and opening of the rear pressure plate through a swinging or pivoting movement around its hinged pins 196.

SHUTTLE ASSEMBLY

The front shuttle for operating the front film is identified by the reference numeral 210 in FIG. 21. This shuttle is provided with a claw 212 at the top adapted to engage in the hole 180 of the film 125 to move it past the film gate. The shuttle is provided further with a cam follower 214 engageable by cam 216, which is mounted upon the shaft 112, as best shown in FIG. 10. The shuttle is pivoted back and forth in an arc-like direction by the cam 216, through a pivotal mounting on a ball pivot 218, as shown in FIG. 22. Thus, the bottom of the shuttle 210 is provided with a hemispherical depression 220, which seats the ball 218 in a bearing plate 222. The shuttle 210 is biased into engagement with the cam by means of a biasing spring 224 connecting the front shuttle 210 to rear shuttle 226 shown in FIGS. 10 and 19. The biasing spring is hooked to support 228 on the front shuttle and 230 on the rear shuttle.

The rear shuttle 226 is constructed in a similar fashion having an identical pivotal arrangement and similar reference numerals are employed for the identical construction. Through the operation of the cam, the front and rear shuttles are caused to pivot back and forth in an arc-like manner in the plane of the film as it passes through the film gate. The film engaging claws 212 are received and move back and forth within the notches 122 of the front and rear pressure plates. The front shuttle 210 is engaged and disengaged with the film by a solenoid to effect perpendicular movement with respect to the plane of the film. The front solenoid is indicated by the reference numeral 234 in FIG. 33 and is shown mounted on the bottom of the base plate in FIG. 9. The solenoid is provided with an armature 236, which is connected to a shuttle operating arm 238 as shown in FIGS. 12, 23 and 24. The armature fits through opening 240 and is connected to the arm 238 by spring pressure plates 242. The arm 238 is pivoted by pivot pin 244 to a trunnion 246 mounted upon vertical support plate 248, as shown in FIG. 12. The upper end of the shuttle operating arm 238 is provided with a yoke 250 which is received within the opening 252 of the shuttle.

The rear shuttle 226 is operated by rear solenoid 254, shown in FIG. 31. This solenoid is mounted to the bottom of the base in a similar fashion to that employed for the front solenoid. The rear solenoid has an operating armature 256 provided with a yoke at the end, designated by the reference numeral 258, which fits within the opening 252 of the rear shuttle to provide for its movement into and out of engagement with the rear film to engage the rear shuttle claw with the advancing notches for the rear film.

THE FILM REEL SPINDLES

The supply film reel spindle 122 is best shown in FIG. 25. It includes a dog 260 adapted to be turned a quarter turn counterclockwise and to the left, as shown in FIG. 25, through detents 262 and 264, which engage a spring biased ball 268. In loading the film, the dog 260 is left in the vertical position to roll out film for threading.

The take up spindle 146 is best shown in FIGS. 26 and 27. As there shown, it is provided with a shaft 270 having a squared bottom portion and a cylindrical upper portion A reel retainer 272 is provided comprising a spring biased ball 274 seated in the bottom of the shaft. This shaft is further provided with a conventional friction clutch (not shown).

TILT MECHANISM

The tilt mechanism to provide for adjustment of the projector in both the vertical position and the horizontal position is generally identified by the reference numeral 280 in FIGS. 15 through 18. It includes an adjustable vertical table engaging support bracket 282 and a horizontal bracket 284, which, depending upon the position of the projector, are adapted to be used as an adjustable base. The tilting mechanism is spring biased by means of a spring 286 connected at one end to post 288 mounted on the housing 80, and at the other to an operating arm 290 mounted on a trunnion portion 292. The operating arm 290 urges a shaft 293, connected to the vertical bracket 282, to the left as viewed in FIG. 16. The operating arm 290 is T-shaped and has a leg connected to a shaft 294 urging the horizontal bracket 284 to the bottom as viewed in FIG. 16. A lock shaft 295 is adapted to bind a collet 296 against the shaft 293 to set the adjustment mechanism to the desired position. Journalling of the shaft 294 is provided by a journal 297 and journalling for the shaft 293 is provided by a journal 298 mounted upon a mounting plate 299 connected to the base 80. The journal 298, as shown in FIGS. 15 and 16 receive the collet in a medial slot.

For the operation of the tilt mechanism, the locking shaft 295 is first loosened, the projector supported on feet 74 or 76 is then tilted to the desired elevation, and the lock shaft 295 is tightened to bind the collet 296 against the shaft 293, which locks the tilt mechanism in secure position. The spring biasing, effected through the spring 286, urges the bracket 282 or 284, depending upon whether the projector is in vertical or horizontal position, into engagement with the support table top or other base.

THE ELECTRICAL CIRCUIT

The principal function of the circuits is to provide properly timed pulses to rear and front shuttle solenoids 198 and 234, respectively. These pulses cause the solenoids to pull the shuttle teeth into engagement with the film sprocket holes 180 and advance the film one frame for each pulse, in a direction which is determined by timing of the pulse with respect to the mechanical position of the shuttle cam 216.

Timing pulses, which differ by 180° of rotation of the cam, are switch selectable to provide for film transport in forward or reverse direction. These timing pulses, which occur once for each revolution of the main shaft, are divided to lower frequencies providing eighteen different operating speeds ranging from one pulse per second to 24 pulses per second providing corresponding frame rates for the film transport. Means are included for gating a single pulse to the shuttle solenoid, when manually actuated by depressing a button. The resulting film frame advance is provided for both the front and rear shuttle solenoids. An additional function of the electrical circuits is to provide control of film motion by means of transparent cue spots 300 printed on the film in the area normally occupied by the sound track. When a cue appears on the front film, the resulting light transmission stops all film motion, both front and rear. When a cue appears on the rear film, the front film will move along with the rear film, one frame for each rear film cue. Automatic spooling of the film from supply and takeup reels is provided by two reel drive motors 126 and 148, respectively, controlled by the spring loaded sensing guides 134 and 140, which determine the size of the film loops and operate the reel motors accordingly to maintain essentially constant loops of film between the supply and takeup reels and the film transport mechanism. A rewind function is included which provides means for rewinding film from the takeup reel back onto the supply reel ready for subsequent reuse. Operation of the circuit shown in FIGS. 42 and 43 in detail is as follows:

Nominal 117 volt AC power is applied through power cord 301 to connector 302 and 304. From pin 5 of 304 this voltage is applied to fuse 306. The other side of the line from pin 6 of connector 304 is connected to terminal 1 of autotransformer 308. The load side of the AC fuse 306 is connected to the wiper of function switch 72, section B. As shown, in the off position, this wiper is connected to an unused terminal 1 of the switch, therefore no AC power is applied anywhere within the circuits with function switch 72 in the OFF, or number one position as shown. When this switch is placed in the load position on terminal 2, AC power from the wiper of section B is applied to terminal 4 of autotransformer 308. Note that in positions 3 and 4 of the switch, the RUN and REWIND positions, this voltage is also applied to terminal 4. Thus, the transformer 308 will be energized whenever the function switch is in any of its three operating positions, load, run or rewind on terminals 2, 3 and 4. Pilot lamp 312 is connected in parallel with terminals 1 and 4 of the transformer and indicates the application of voltage to the transformer. The transformer provides 26 volts AC between its terminals 1 and 3. These terminals are connected to the input terminals of a bridge rectifier 314 consisting of unidirectional diodes 316, 318, 320 and 322 in the power supply assembly 323. The output of this bridge rectifier is filtered by condenser 324 and provides approximately 28 volts DC to power circuits within the equipment. The negative side of the bridge output, the junction of diodes 316 and 320, is connected to one side of load solenoids 198 and 202. For convenience throughout the discussion of the circuit functions, and in accordance with standard practice, this negative output of the power supply will be referred to as DC common. The filtered positive output available at the junction of 318 and 322 is protected by a DC fuse 326, and applied to the wiper of the function switch 72, Section A. With this switch in the load position, 28 volts DC is applied across the load solenoids. These solenoids retract the front and rear pressure plates 186 and 188 allowing the film to be loaded into, or removed from the film gates. When the function switch is placed on terminal 3, the RUN position, this 28 VDC is applied from Section A, terminal 3, through pin 9 of connector 328, pin L of cable 330, to a terminal of projector ON-OFF switch 56, located on the remote control unit 54. When this switch is placed in the ON position, 28 volts DC is supplied back through pin K of cable 330, through pin 8 of connector 328, to the upper terminals of front and rear shuttle solenoids 234 and 254, respectively, to one side of the timing lamp 332 through resistor 334, to terminal 1 of the power relay 336, and to terminal 7 of the power supply 323. The function of the remaining components in the power supply is to regulate and filter the 28 volt input applied at terminal 7, and provide outputs of 8, 18, and 5 volts. This is accomplished with a series regulating transistor 338, a reference diode 340, resistors 342 and 344, and capacitor 346, which provide an 18 volt output. Resistors 348 and 350 and diode 352 in the power supply, and diode 340 in the main circuit board assembly 362 provide 5 and 8 volt outputs. With switch 56 in the remote control unit in the ON position, the function switch 72 in the RUN position, the timing lamp 332 illuminates, power supply output voltages appear, the power relay 336 is energized, and the shuttle solenoids 234 and 254 have voltage applied to their upper terminals. Energizing the power relay 336 supplies 21 volts AC from transformer 308 terminals 1 and 2 to projection lamp 104, and completes the circuit for 120 volts AC through contacts 7 and 10 to the main drive motor 90. This 120 volts AC is also applied through terminal 3 of section C of the function switch to the wiper of this section and then to the takeup and supply reel motor armatures 148 and 126, respectively. (BLK leads)

SINGLE FRAME OPERATION

Assume the switches in the remote controller unit 54 are set as follows:

Cue switch 62 in ON. Single front switch 70 is not depressed. Single Rear switch 68 is not depressed. Start switch 64 is not depressed. Stop switch 66 is not depressed. The ON-OFF switch 56 has been placed in the ON position. FOR-REV switch 60 is in the FOR position and rear front switch 58 is in the front position. Under these conditions a single frame of film may be moved in the forward direction by depressing either the single front or single rear push button. Assume the single front switch is depressed. The regulated plus 18 volts from the power supply is supplied to the common terminal of this switch. Depressing it will cause this 18 volts to be applied through the normally open contact (NO) to pin Y of connector 358, where it passes through the cable 330 and is applied through pin 1 of connector 304 in the circuit board 362. This provides a positive voltage through resistor 364 to terminal 5 of gate 366. In addition, this positive voltage is applied through diode 368 and capacitor 370 and diode 372 to the base of transistor 374. This transistor and transistor 376, along with resistors 378, 380, 382 and 384 make up a monostable multivibrator with an output appearing at the collector of diode 376, which is a positive pulse of voltage whose duration is normally in excess of 30 milliseconds. In the stable state, transistor 374 is conducting heavily by virtue of the base current provided through resistor 380. The positive pulse applied through diode 372 momentarily reduces transistor 374 base current to zero, thus reducing the collector current to zero and causing the voltage drop across resistor 378 to go to zero, therefore the collector potential of transistor 374, which had been approximately 5 volts positive, now goes to zero, causing a heavy flow of base current through transistor 376, causing it to conduct heavily, increasing the drop across resistor 382 to approximately 5 volts. This positive 5 volts is applied to the base of transistor 388, a common collector amplifier used to isolate the multivibrator output from its load. Duration of the output pulse is determined primarily by resistor 380 and capacitor 386. The positive output from this multivibrator, as amplified by transistor 388, is applied to terminal 3 of gate 366, thus providing two positive inputs at this gate, the one previously applied through resistor 364 to terminal 5 and the present output of the multivibrator applied to terminal 3. Terminal 4 of this gate is connected to the junction of resistors 390 and 392. At this junction positive timing pulses appear, being applied through capacitor 346 from pin 13 of connector 360. These timing pulses are generated in the following manner:

Positive 18 volts from the power supply is applied to the left terminal of a timing photodiode 394. The right terminal of this diode is connected through pin 21 of connector 360 to the base of an amplifier transistor 396. The amplifier signal is taken from the emitter of this transistor and applied to the base of transistor 398, connected in what is generally termed a paraphase amplifier circuit. The timing photocell 394 is illuminated by the timing lamp 332, through the shutter 108, connected to the main shaft which blocks the light during 180° of the shaft revolution. When illuminated, the resulting current through the photodiode, amplified by transistor 396, causes the transistor 398 collector current to drop to zero, therefore the voltage previously existing across resistors 400 and 402 decreases to zero at this time. It is evident that two symmetrical square waves of opposite polarity are generated at the collector and emitter of transistor 398. The DC component of voltage appearing at the emitter is removed by the coupling circuit consisting of capacitor 404 and resistor 406 and the signal is applied through pins 19 of connector 360, 10 of connector 328, and pin M of cable 330 to one section of forward-reverse controller switch 60, which is in the forward position as shown. The inverted output from transistor 398 collector is applied through pin 22 of connector 360, through pin 11 of connector 328, pin R of cable 330 to the other terminal of the Forward-Reverse switch. In the position shown therefore, the common terminal of the Forward-Reverse switch applies a signal taken from the emitter of transistor 398 through pin S of cable 330, 12 of connector 328, to pin 13 of connector 360. This square wave appearing at terminal 13 is differentiated by a short RC time constant circuit consisting of condensor 408 and resistor 390. Therefore at the junction of resistors 390 and 392 are positive and negative pulses of relatively short duration. The negative pulses have no effect on any of the circuits to which they are applied and may be ignored. The positive pulses, however, are effective and are defined as timing pulses. AND gates 410, 412, 414, 416 and 418 and OR gates 420 and 422, output terminals 3, 6, 11, 8, 8, 12 and 6, respectively, are negative when all gate inputs are simultaneously positive. Conversely, it can be stated that if any gate input is negative the output will be positive. The presence of a positive timing pulse at pin 4 of gate 412 results in a negative pulse at pin 6, since positive inputs had previously been established at pins 5 and 3. The resulting negative pulse appearing at the output pin 6 is applied to pin 2 of gate 420 resulting in a positive output from this gate appearing at terminal 12. This positive output triggers transistor 424 into conduction. This transistor and transistor 426 make up a monostable multivibrator with an output pulse adjustable in duration from approximately 10 to 25 milliseconds, by varying the value of resistor 428. This output is amplified by transistor 430 and applied through resistor 432 to the base of transistor 434, a switching power transistor which effectively grounds the lower terminal of front shuttle solenoid 234 through resistor 436 for the duration of the pulse generated by the multivibrator transistor 424 and 426. At the conclusion of this pulse, the voltage at the collector or transistor 434 will rise from essentially zero to the plus 28 volt power supply voltage. This rise is coupled through resistor 438 and capacitor 440 and applied through diode 442 to the base of transistor 444, one of the transistors in the multivibrator consisting of transistors 374 and 376. The resulting positive voltage at the base will turn off transistor 376, restoring the monostable multivibrator to its stable state concurrent with the trailing edge of the pulse supplied to the front shuttle solenoid. In the manner described, depressing the Single Frame Front push button, 90, has allowed only a single properly timed pulse of the desired duration to be applied to the front shuttle solenoid, moving a single frame of the front film in the forward direction as selected by the Forward Reverse switch. In a similar manner a single frame of rear film may be moved. Depressing Single Frame REAR switch 68 applies 18 volts DC from switch 70 common to pin Z of cable 330, to pin 2 of connector 304, to pin 8 of connector 360 where this voltage is applied through resistor 444 as one of three inputs required at pin 9 of gate 416. This same voltage is applied through diode 446 and capacitor 370 to the single frame multivibrator, consisting of transistors 374 and 376, causing it to generate a positive output from the isolating amplifier transistor 388 in a manner identical to that previously described for the single frame front function. This output is applied to pin 11 of gate 416. At pin 10, timing pulses previously described as appearing at the junction of resistors 390 and 392 are applied. Therefore, at pin 8 of gate 416, a negative pulse will appear, which, applied to pin 4 of the 422 gate, results in a positive pulse at pin 6 of this gate, applied through resistor 448 to the base of transistor 450. This transistor and transistor 452 along with transistors 454 and 456 make up a multivibrator power amplifier combination for the rear shuttle solenoid 254 identical to the combination of transistors 424, 426, 430 and 434 for the front solenoid. Therefore, a single pulse will be delivered from the collector of transistor 456, which will drive the rear shuttle solenoid in a manner identical to that described for the front solenoid. The positive trailing edge of the solenoid pulse appearing at the collector of transistor 456 is applied through resistor 458, capacitor 460 and diode 442 to the base of transistor 376 to reset the single frame multivibrator to its stable state in a manner identical to that previously described for front film operation.

CONTINUOUS OPERATION

Either the front or rear film may be driven continuously at a speed ranging from one through 24 frames per second determined by the setting of speed control switch 67 in the remote control unit. To initiate film motion, the normally open push button switch 64 in the remote control unit is depressed. Positive 18 volts DC supplied to the common terminal of this switch from the power supply will then be supplied through its normally open contact through pin E of cable 330, pin 5 of connector 328 to pin 11 of connector 360. This positive voltage is applied through isolating diodes 464 to the gate terminal of a silicon controlled rectifier 466. The anode of this rectifier, connected to pin 12 of connector 360, is supplied with a positive eighteen volts through the normally closed stop switch 66, in the remote control unit. When the positive gate signal appears, rectifier 466 is driven into conduction, and characteristically will remain conducting even though the gate signal is subsequently removed. The positive voltage at pin 12 of connector 360 is thus supplied to resistors 468 and 470 in series to DC common. This voltage may be removed if desired by momentarily depressing the normally closed stop switch 66 in the remote control unit, removing the voltage supplied to the anode of rectifier 466, reducing its current to zero, and restoring it to the non-conducting state. The voltage supplied from the cathode of diode 466 to resistor 468 is taken from the wiper of potentiometer 472, through pin 10 of connector 360, 3 of connector 328, through pin C of cable 330 to the common terminal of speed switch 67 in the remote control unit. This switch connects a number of resistors as required, to establish the desired film transport speed by selecting the charging circuit resistance for 474, the timing capacitor in a unijunction oscillator circuit. Timing pulses appearing at the junction of resistors 390 and 392, previously described, are applied through capacitor 476 to the base of amplifier transistor 478. This transistor normally operates in a cut off condition, therefore only the positive portion of the timing pulses will cause it to conduct to saturation, providing constant amplitude negative timing pulses at the base 2 lead of transistor 480. These timing pulses synchronize the conduction of the unijunction oscillator, whose frequency would otherwise be determined only by the RC time constant consisting of capacitor 474 and resistance selected by speed switch 67 in the remote control unit. Component values are chosen to provide input pulse to output pulse ratios from 1:1 to 24:1. The positive unijunction oscillator circuit output pulses appear at the junction of resistors 482 and 484 are applied to pin 12 of gate 414 and pin 2 of gate 410. The other input terminal 1 of the latter gate is connected through pin 4 of connector 360, pin 4 of connector 304 and pin b of cable 330 to a terminals on the Front Rear switch 58. In the position shown on the schematic, this terminal is open, therefore there is no electrical connection to input terminal 1 of gate 410 which allows it to assume a positive state, the output, terminal 3, therefore assumes the negative state, for each positive pulse applied to terminal 2 from the counter circuit. These negative pulses are applied to terminal 13 of gate 420, which functions as an OR gate with inverter, and delivers a positive output pulse at pin 12 for each negative pulse appearing at its input. Resistor 486, connected from this terminal to plus 5 volts, provides additional output current. The positive output pulse, applied through resistor 488 to the base of multivibrator transistor 424, will develop a pulse whose duration is controlled by resistor 428, amplified by transistor 430, and applied to the front film solenoid 234, moving the film one frame for each counter pulse, in a manner identical to that previously described under single frame front operation. For continuous film motion of the rear film, switch 58, in the remote control assembly, is placed in the rear position. In this position, input terminal 1 of gate 414 is ungrounded and assumes a positive potential. Counter output pulses appearing at the junction of resistors 482 and 484 are applied to the other input terminal 12 of gate 414. The simultaneous positive inputs at these two terminals result in a negative output pulse appearing at the output terminal II, which in turn is applied to pin 5 of gate 422, providing a positive pulse at its output terminal 6, which in a manner identical to that previously described under single frame rear operation, will trigger and rear film multivibrator, whose amplified signal drives the rear solenoid 254 to move the rear film one frame for each pulse.

CUING FUNCTION

The cue lamp 494, which is illuminated under all conditions, is arranged to illuminate front cue photocell 496 or rear cue photocell 498 whenever a transparent cue spot appears in the opaque sound track area of the corresponding film. When a cue appears on the front film it allows light from the cue lamp to illuminate photocell 496. Conduction of this photocell applies a positive voltage through resistor 500 to the base of amplifier transistor 502. Conduction from this transistor provides a low resistance path to DC common for the condenser 474 charging current supplied through the speed switch resistance in the remote controller unit. This prevents the voltage on this capacitor from rising to a value sufficient to provide an output pulse from transistor 480, therefore no counter output pulses appear at the junction of resistors 482 and 484 as long as the front photocell 496 remains illuminated. Depressing the single front button 70 will cause a single frame of front film to move the cue mark away from photocell 496, cutting off the illumination and allowing continuous motion of the film to resume. In similar manner, depressing the start switch 64, in the remote control unit, although having no effect on transistor 466, which is already conducting, will cause a positive voltage to be applied through diode 464 and the upper section of switch 58 to pin y of cable 330, to pin 0 of connector 360, initiating the single frame front film motion in a manner identical to that obtained from operation of the single front switch 70. In similar manner, if switch 58 is in the rear position, an additional positive pulse through diode 464, obtained by depressing start switch 64, is applied to the line used to initiate single frame operation, thus moving film and restoring continuous film motion which had been previously halted by the presence of a front film transparent cue spot.

When a transparent cue spot appears on the rear film, cue lamp 494 will illuminate the rear cue photocell 498, applying a positive voltage through resistor 504 to the base of amplifier transistor 506. The amplified current from this transistor appearing across resistance 508 causes input terminal 9 of gate 418 to go positive. The other input terminal, terminal 10, is connected to the output of gate 422, terminal 6. This pulse, as previously described, is used to initiate rear solenoid pulse and move the rear film one frame for each such pulse. Each such output pulse of gate 422 will also appear inverted at the output of gate 418 as long as input terminal 9 is maintained positive by the action of the rear cue photocell. Thus, every pulse moving the rear film will appear at the output terminal 8 of gate 418, which in turn is connected to the input of gate 420 terminal 1 and cause a frame of front film to move. As long as the rear cue photocell 498 is illuminated, any rear film pulse appearing at the output of gate 422 will also appear at the output of gate 418 and drive the front film.

FILM-SPOOLING

Operation of the take up and supply reel drive motors 148 and 126, respectively, is described as follows: For reverse operation, effected by switch 60, relay 510 is deenergized, as shown, relay contacts 3 and 4 connect the normally closed contacts of switches 166 and 170 to the AC common terminal, 1, of transformer 308. Function switch 72, when placed in position 3, the run position, supplies 120 volts appearing at terminal 4 of transformer 308, through contacts 7 and 10 of the power relay 512, to the leads 151 and 129, respectively, to take up motor 148 and supply motor 126. These motors are split field reversible motors having split field coils 148 and 127, respectively. Voltage applied between their leads 151 and 129 at the top or bottom of the split field coils 149 and 127 will cause them to rotate in forward or reverse directions. If the film loop controlled by the take up motor becomes too small, loop switch 170, is operated from the position shown by the take up sensing arm 140 to a condition where the common and normally closed contacts are connected together. This connects the bottom coil lead of the take up motor to AC common. Since 120 volts is applied to the lead 151 of this motor, it will rotate the take up reel spindle in the counterclockwise direction paying out additional film and returning switch 170 to the position shown and restoring the loop to normal size. The circuit through switches 168 and 172 are inoperative in this position of switch 60, because of the operation of relay 510. If the projector is being operated in the forward direction, relay 510 will be energized and the AC common will appear at terminal 5, providing a ground for the normally closed contacts of switches 168 and 172. When takeup loop sensing switch 172 is operated from the position shown, the top coil lead of the takeup motor will be connected to AC common, causing the motor to rotate in a clockwise direction, taking up excess film and maintaining a constant loop size. The supply reel spindle motor is operated by switches 166 and 168 in a manner identical to that described for the operation of the takeup reel motor. With relay 510 de-energized, as shown, excessive loop size will allow the spring loaded sensing guide 134 to operate switch 166 and cause the supply motor to operate in the takeup direction by virtue of the AC common connection to its bottom lead of coil 127. Similarly, in the forward direction, AC common connection is provided for the top coil lead through switch 168 in the position shown, and contacts 3 and 5 or relay 510 in the energized position, causing the supply reel spindle to rotate in the pay out direction, increasing the loop size in accordance with film motion.

REWIND

After film has been run through the projector and the program is completed, it is necessary to rewind all the film back into the supply reel. This is accomplished as follows: With no film passing over the sensing arms, the sensing arm switches are positioned as follows: switch 166 to NO; switch 170 to NC; switch 168 to NC; switch 172 to NO. When function switch 72 is placed in the rewind position, relay 510 will be de-energized since there is no 28 VDC available through section A of the function switch. Neither the bottom or top coil lead of takeup motor 148 is connected to AC common. The bottom lead of coil 127 of supply motor 126 is connected through switch 166 and NC contacts, through contacts 4 and 3 of relay 510 to AC common. The lead 129 of the supply reel motor is connected through function switch 72 section C, common to 120 volts AC, causing the supply reel motor to rotate in a takeup direction rewinding the film from the takeup to the supply reel. Takeup reel spindle is provided with a friction clutch mechanism to allow the spindle to rotate during the rewind operation. Capacitors 514, 516, 518 and 520, in combination with resistors 522, 524, 526 and 528, placed across switchs 170, 166, 172 and 175, respectively, are used to reduce sparking of the switch contacts. To accommodate both clockwise and counterclockwise wound film, a reversing switch 530 is provided in the field of supply motor 126.

OPERATION

The projector is capable of simultaneous projection of two superimposed front and rear 16 mm films, located in planes 0.03 inch apart, controlled manually remotely by the operator as well as automatically by cue marks on the film. The front film capacity is, for example, 400 feet. The rear film is generally formed in a continuous loop for projection and/or control of the front film, and for example, may be 6 feet of film (240 frames).

Film is transported at any of 18 accurate selectable rates between one and twenty four frames per second, in either the forward or reverse direction. Reversing action is instantaneous and may be done with film in motion at any speed.

The remote operating controls on the remote controller 54 include START and STOP buttons 64 and 66, PROJECTOR ON-OFF switch 56, FORWARD-REVERSE selector switch 60, FRONT-REAR film selector switch 58, CUE ON-OFF switch 62, and FRONT and REAR SINGLE FRAME advance buttons 70 and 68. Utilizing these controls it is possible to advance either the front or rear film, as selected, in either the forward or reverse direction, one frame at a time, continuously at the preselected speed, or automatically.

The function switch 72 located on the projector panel allows the operator to select the LOAD-UNLOAD condition which opens the film gates to allow film to be inserted or removed, the RUN condition which transfers control to the Remote Controller unit, or REWIND, for rapid rewinding of the film reel. An OFF position is provided which removes all power from the equipment. The Pilot Lamp 312 indicates when power is applied.

Both front and rear films utilize cue marks 300 in the area normally occupied by the sound track, which are used to control the film motion. When a cue mark appears on the front film, all film motion stops. Motion is restarted by depressing the START button. When a cue mark appears on the rear film, motion does not stop, but the front film will move one frame in the same direction, in synchronism with the next rear film advance. In this manner it is possible for the rear film to control the advance of the front film in any desired manner.

Continuous dwell on any frame is possible without damage to the film, reduction in screen brightness or defocussing of the projected image. The change from one frame to the next occurs instantaneoulsy with no intervening dark screen line. Flickerless performance is assured by using a flicker frequency higher than standard for motion picture projectors. A high efficiency optical system assures adequate screen brightness with minimum heat from a 250 watt low voltage projection lamp 104. A high resolution, field corrected 2 inch $f$ 1.5 projection lens assures a projected image with superior focus and resolution.

The projector operates between 105 and 125 volts. Power consumption is nominally less than 400 watts.

The front film is loaded by placing a full reel of film on the reel spindle 122 with the round hole in the reel hub next to the projector body.

Any empty takeup reel is then placed on the spindle takeup 146 Take Up, with the square hole in the reel next to the projector body.

The supply reel drive dog is left in the disengaged (up) position, to allow the reel to rotate freely, and pull sufficient film off the supply reel to thread into the Take Up reel loading slot. Manually rotate the Take Up reel in a clockwise direction for several turns in order to secure the film.

The Take Up reel shaft has a friction slip clutch and can be rotated by hand, the Supply reel shaft, however, cannot be rotated and should not be forced. For this reason the Supply reel drive dog has been left in its open position to allow the reel to rotate freely around the shaft, while loading.

Set the function switch 72 on the body of the projector to the Load-Unload position. Set the projector switch 56 on the Controller to the Off position.

Starting from the Take Up reel, thread film along the threading path marked on the projector panel, through the film gate and back to the Supply reel. Rotate the Supply reel manually to take up any excess length of film and engage the Supply reel drive dog in the Supply reel slot.

Turn the function switch to the Run position and press the film down in the gate to make sure it is properly engaged. Film is engaged when an upward pull will not dislodge it from the film gate.

Select the desired speed with the speed control switch 67 at the top of the Controller. Set the PROJ. switch to the On position. The projector motor should start and the lamp illuminate. Select for direction in switch 60 on the Controller.

To initiate film motion, depress the Controller Start button 64. To stop film motion, depress the Stop button 66. To move the film one frame at a time, depress the Single Frame Front button 70. To stop film which has been prepared with special cue marks, turn the Cue switch 62 to the On position. To reverse direction of film motion, select Rev position on switch 60. Operation of the Film Switch 58 to either the Front or Rear position will not effect film motion unless there is a film loaded in the rear film gate. This mode of operation is covered below.

For loading film loops in rear film gate, set function switch 72 on the projector panel to Load. Push film loop down in rear film gate, sprocket holes down. Thread loop toward rear of projector, inside the loop guide rails. Set function switch to Run and check loop to insure proper engagement in the film gate. To run a loop, the film switch 58 on the Controller is placed in the Rear position. The Controller switches will now operate the rear film. The presence of a cue spot on the rear film will cause the front film to move automatically. As when using front film only, the presence of a front film cue, will cause all film motion to stop automatically. Motion is restarted by depressing the Start button.

For elevation adjustment, loosen the Elevation locking knob by rotating slightly in the counterclockwise direction. Raise the front of the projector by hand to the desired position and lock in place by rotating the Elevation knob clockwise.

Rewinding is most easily accomplished if the film is not allowed to run completely off the Supply reel. To remove film from the gate, the function switch 72 on the projector panel must be set to the Load-unload position. The film will now slide up clear of the gate. Disengage the film from the gate and guide rollers and rotate the Take-up reel in the clockwise direction to take up excess film. Turn the function switch to the Rewind position. Film will be rewound on the Supply reel. When film is completely rewound, turn function switch to Off, disengage the Supply reel drive dog, and remove the reel and film from the projector.

Various changes and modifications may be made within this invention as will be readily apparent to those skilled in the art. Such changes and modifications are within the scope and teaching of this invention as defined by the claims appended hereto.

What is claimed is:

1. A film projector comprising a housing, projection lamp and lens and an aperture gate, means for advancing a front film past said aperture gate and means for advancing a rear fixation film in the same direction as the front film past said gate, the front advancing means and the rear advancing means comprising front film and rear film shuttles engageable with the front and rear films and commonly operable by a single cam member.

2. The film projector of claim 1 in which means are provided for timing the relative movement of said shuttles.

3. The film projector of claim 1 in which front film operating means are provided for engaging and disengaging the front film, and rear film operating means are provided for engaging and disengaging the rear film.

4. The film projector of claim 3 in which the front film operating means and the rear film operating means are provided with separate control means.

* * * * *